Patented June 24, 1930

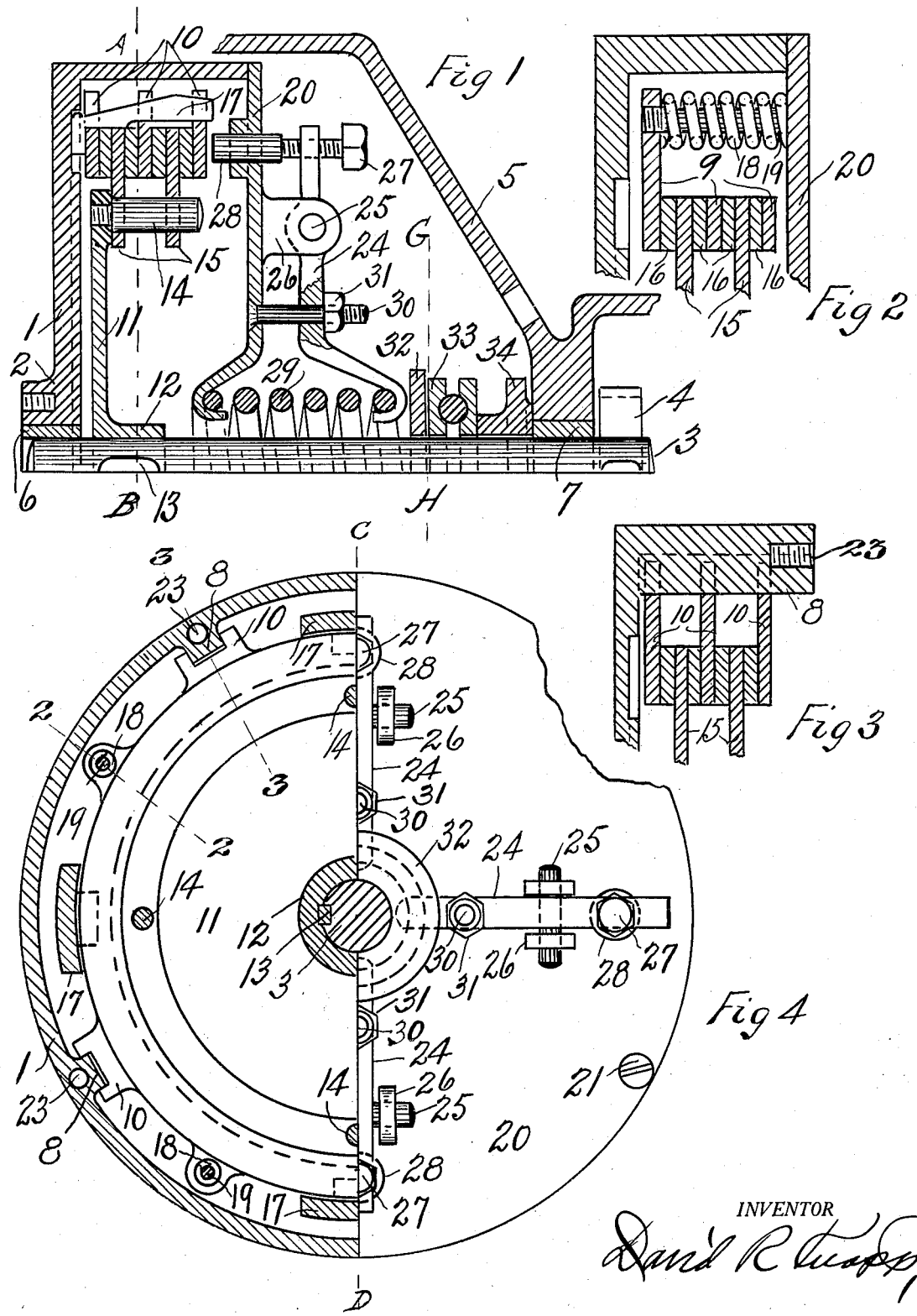

1,765,983

UNITED STATES PATENT OFFICE

DAVID R. KNAPP, OF PHILADELPHIA, PENNSYLVANIA, ASSIGNOR, BY MESNE ASSIGNMENTS, TO AUTOMATIC DRIVE AND TRANSMISSION COMPANY, OF GLOUCESTER CITY, NEW JERSEY, A CORPORATION OF NEW JERSEY

AUTOMATIC CLUTCH DEVICE

Application filed September 21, 1926. Serial No. 136,818.

This invention relates to clutch devices and more particularly to the class of clutch devices which are used in automotive vehicles where automatic means is used to vary the power and speed relationship between the driving and driven elements so as to obtain slipping frictional engagement when the engine is rotating at relatively slow speed and substantially non-slipping engagement at a predetermined higher speed.

The object of the invention is to provide an automatic clutch as above described and also, as an additional but integral part, means for manual control when so desired.

A further object of the invention is to provide, in the manual means, a mechanism to release the clutch plates by the use of the foot pedal commonly provided in such vehicles so as to require a minimum amount of foot pressure and at the same time to exert maximum resistance against reverse pressure application and motion tending to prevent positive non-slipping engagement between the clutch plates.

With these objects in view, my invention consists of a certain novel construction and arrangement of parts as will be hereinafter pointed out in the specifications and claims, reference being had to the accompanying drawing forming part of this application in which Fig. 1 represents an upper half-section showing a convenient embodiment of the invention and a relative location of parts (the centrifugal weights only not being in section); Fig. 2 represents a section 2—2 on Fig. 4 showing more particularly the spring secured to the inner driving plate for the purpose of separating the friction plates at slow speed in order to prevent plate engagement; Fig. 3 represents a section 3—3 on Fig. 4 showing the method of securing the driving plates to the flywheel; and Fig. 4 represents an end elevation half-section on the line A—B of Fig. 1 and a half-section G—H of Fig. 1 omitting the casing 5.

In the said figures, similar numerals of reference refer to similar parts throughout the several views. In the said views the numeral 1 designates a flywheel connected to an engine shaft, hereinafter called the driving shaft, by means of the hub 2. The numeral 5 designates a casing enclosing the entire mechanism, one extremity of which forms the gear-changing enclosure and the other of which is attached to the engine housing (not shown) but forming the usual construction found in the modern automobile.

The numeral 3 designates a shaft, hereinafter called the driven shaft, having two journals, one, designated by the numeral 6, in the flywheel hub 2 and the other, designated by the numeral 7, in the casing 5. On the shaft 3 is the pinion 4 contained in the gear enclosure, through which power is transmitted to the drive shaft of the automobile.

The flywheel consists substantially of a radial flange having on its periphery a laterally-extending flange. On the inner surface of the said lateral flange and forming an integral part therewith are the keys 8 which extend from the junction of the two flanges to the end. Engaging the keys 8 are annular driving friction plates 9 provided with external keyways 10. Under these conditions, the driving plates 9 are constrained to rotate with the flywheel 1 but may have lateral movement on the keys 8.

The numeral 11 designates a radial flange having the hub 12 which is concentrically mounted on the shaft 3 and is keyed thereto by the key 13. On the outer periphery of the said flange 11 are disposed laterally extending pins or protuberances 14 which carry annular driven friction plates 15. The inner peripheries of these driven plates 15 are provided with apertures adapted to slidably engage the pins 14. Intervening between the driving plates 9 and the driven plates 15 are the annular friction discs 16, Figure 2, which are held in position by these plates and by the pins 14.

Interposed between the set of plates above described and the flywheel 1 are centrifugal weights 17 having both radially- and axially-extending members. The inner ends of these weights are provided with toes, extending inward radially and partly encompassing the inner driving plate, positioned in recesses in the flywheel so that the outer end of the toe forms a fulcrum at the outer edge of the recess about which the weight can pivot. The remainder of the weight extends axially inside the flywheel and is free to move outwardly under centrifugal action except in so far as it is constrained by the various parts herein discussed, particularly by the position of the axial flange of the flywheel.

It is obvious that, when these weights are thrown outward by centrifugal action, the toe of the weights will move the plates 9 and others in contact with it against the outer driving plate. This will cause frictional engagement between the plates of the system, provided that the outer driving plate is denied lateral movement.

Referring to Fig. 2, the numeral 19 designates a pin threaded into an ear on the outer periphery of the inner driving plate 9 and extending axially therefrom. This pin carries a helical spring 18. The action of this spring against a hereinafter described cover plate 20 tends to force this inner driving plate 9 against the face of the flywheel and to oppose the action of the centrifugal weights. These springs 18 will hereafter be known as idling springs.

The flywheel enclosure is covered by a plate 20 which is secured in place by screws 21 engaging with threaded apertures 23 in the flywheel 1.

The numeral 24 designates a lever arm fulcrumed by the pin 25 which engages the ears 26 in the cover plate 20. The lever 24 is provided at its outer end with an adjusting screw 27 which engages a plug 28 extending axially through the cover plate 20 and in slidable relation therewith. The inner face of this plug abuts against the outer driving friction plate 9. In the construction shown in the drawing I have shown four of these arms spaced equidistant and radially on the outer surface of the cover plate 20. This screw and plug as a system will hereafter be called the plate adjusting screw.

At the opposite extremity of the levers 24 are hooks adapted to receive and retain one end of a helical spring 29 which surrounds the driven shaft. The other end of the spring is received and retained by an annular recess in the cover plate. This spring will hereafter be known as the clutch spring.

Interposed between the cover plate and the lever is an adjusting bolt 30. This bolt extends through the lever with a loose fit at a point intermediate between the fulcrum 25 and the lever arm hook. The bolt is provided with a nut 31 for adjustment means. This system will hereafter be termed the clutch spring adjusting bolts and refers to a plurality of such members.

The numeral 32 designates an annular plate positioned on the shaft 3 and slidable thereon. The plate is adjusted to press against the lever arms so as to compress the clutch spring 29 when the clutch pedal of the automobile is pressed down. Interposed between the clutch pedal mechanism and the plate are the usual ball bearing 33 and the operating sleeve 34.

The force exerted through the plate adjusting screw, at the short end of the lever 24, relative to that exerted on the annular plate 32, at the long end, is regulated by the length of the ends of the lever and the position of the fulcrum. The system may be acted upon by: first, the movement of the clutch pedal system; second, the clutch spring and, third, the movement of the centrifugal weights as transmitted through the plate adjusting screw.

It is desirable that the lever arm be movable with comparative ease by the operation of the clutch pedal as in de-clutching and that it resist the movement of the plate adjusting screw with sufficient force to maintain plate engagement. Under these considerations, the fulcrum is placed between the plate adjusting screw and the clutch spring so as to make the arm at the plate adjusting screw end shorter than the other.

Having thus described the several parts throughout the views the operation and adjustment of the device will be substantially as follows, all of which will be readily understandable to those skilled in the art to which the invention relates.

Assuming the parts to be in correct proportion and assembled in an operative structure such as an automobile, the adjustments are made as follows:

The clutch spring adjusting bolt nuts 31 are turned on their bolts 30 until the correct tension is exerted on the clutch spring. The disc 32, ball bearing 33 and member 34 are moved to a position such as to give the proper clearance between the disc 32 and the ends of the levers 24.

The plate adjusting screws 27 are then adjusted so that the plug 28 bears against the outer driving plate 9. The device is now in an operative position. It is obvious that the operating conditions such as wear and heat will cause variation in the thickness of the system of friction plates. For this reason, it is desirable that the plate adjusting screw be of variable length as shown.

When the engine is started, the flywheel revolves and exerts force on the centrifugal weights, which consequently tend to move outward with respect to the central shaft axis. The outward movement of the weights causes the toes to rotate about their fulcrums and thereby to move the driving plates into engagement with the plugs 28. This movement is resisted by the idling springs 18 whose force is transmitted through the plate 9, until the resistance of such springs is exceeded by the force of the centrifugal weights. Consequently the plates remain out of contact so far as the effective transmission of power is concerned at the idling speed of the engine. For this reason the clutch is inoperative so far as the propelling of the vehicle is concerned. Consequently, at this period, the drive shaft of the automobile can be placed in operative relation with the driven shaft 3 in the usual manner, as by the selection of "high gear."

Now, if the speed of the engine is accelerated to a point where the force exerted by the centrifugal weights through their toes exceeds the resistance of the springs 18, the friction plates will be moved into and held in frictional engagement. If the force exerted by the centrifugal weights exceeds that of the springs but slightly, the driving and driven plates will slip by each other and transmit relatively little power; but as the force of the centrifugal weights becomes relatively great, the plates will be held in substantially non-slipping engagement because of the increased pressure. At this stage, the driving and driven shafts are direct connected.

The lateral movement of the plates away from the toes of the centrifugal weights is restricted by the face of the plugs 28, the levers 24 and the clutch spring 29. The resistance to movement of this system is sufficient to maintain the plugs 28 in a substantially fixed position because of the increased resistance caused by lever action.

When the conditions under which the vehicle is to be moved require the use of increased torque, it is, as usual, obtained by the selection of the appropriate gear. In order to effect this change, the clutch foot-pedal is operated to compress the clutch spring 29. This effects the withdrawal of the plugs 28 from the face of the nearest driving plate beyond the point at which resistance to the pressure of the centrifugal weights, whose movement is restricted as previously noted, can be exerted. This motion causes the disengagement of the friction plates and prevents further transmission of power. Under the condition so gained, it is possible to shift gears in the ordinary manner. When the operation is completed, the normal operating condition is restored by the release of the clutch pedal.

The dual function of the clutch spring, namely, to oppose the action of the centrifugal weights with sufficient force for contact resistance and to operate as clutch releasing agent under foot-pedal pressure, renders necessary for efficient operation the intervention of a lever. This construction is necessary otherwise the pressure of the spring 29 would be too great to operate conveniently by manual means.

Should the vehicle be in motion, the operation required for stopping is as follows. The flywheel is decelerated until the pressure of the springs 18 exceeds that of the centrifugal weights at which time the inner driving plate 9 moves out of contact with the others and releases the pressure required for contact resistance. This causes the declutching of the driving and driven plates and prevents the further transmission of power. The vehicle may then be brought to rest while in gear either by the loss of inertia or by braking in the normal way regardless of the gear which may have been selected.

The foregoing discloses a method by which the driving and driven plates are operated either automatically or manually. Manual disengagement is effected through a mechanism in which minimum pressure from an outside source is required.

I am aware that automatic clutches have been devised wherein the automatic clutch and the manual clutch are two separate devices and also where they are in one unit in which the manual means is effected by direct spring pressure. These require pressure which is prohibitive in practice as applied to present vehicles.

I do not want to limit myself to the exact construction shown as it is obvious that certain departures can be made to perform the same function as the levers 24 but what I claim as new and desire to secure by Letters Patent is:—

In an automatic clutch, the combination of a flywheel driven from a driving shaft, a driven shaft, slidably mounted friction plates between said flywheel and said driven shaft, certain of said plates being driven by said flywheel and others of said plates being connected to said driven shaft, means including centrifugal weights for causing said plates to engage at predetermined speeds of said flywheel, a series of springs opposing said weights to separate said plates at idling speed, a cover plate for said flywheel, a plurality of levers mounted on said plate, a helical spring interposed between the inner ends of said levers and a fixed part to maintain said levers under pressure, parts respectively held by the outer ends of said levers pressed toward said plates, and manually actuated means for overcoming said spring to shift said levers irrespective of the centrifugal force of said weights whereby said plates can be declutched at will.

In testimony whereof I affix my signature.

DAVID R. KNAPP.